United States Patent
Schmidt

(10) Patent No.: US 11,228,928 B2
(45) Date of Patent: Jan. 18, 2022

(54) TEST SYSTEM AS WELL AS A METHOD OF TESTING A DEVICE UNDER TEST

(71) Applicant: Rohde & Schwarz GmbH & Co. KG, Munich (DE)

(72) Inventor: Stefan Schmidt, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 86 days.

(21) Appl. No.: 16/787,656

(22) Filed: Feb. 11, 2020

(65) Prior Publication Data
US 2021/0250791 A1 Aug. 12, 2021

(51) Int. Cl.
| | |
|---|---|
| H04W 24/06 | (2009.01) |
| H04B 17/30 | (2015.01) |
| H04W 24/08 | (2009.01) |
| H04B 7/06 | (2006.01) |
| H04W 76/10 | (2018.01) |
| H04W 72/04 | (2009.01) |
| H04B 17/00 | (2015.01) |
| H04W 84/04 | (2009.01) |

(52) U.S. Cl.
CPC .......... *H04W 24/08* (2013.01); *H04B 7/0617* (2013.01); *H04B 17/0085* (2013.01); *H04W 72/0413* (2013.01); *H04W 76/10* (2018.02); H04W 72/046 (2013.01); H04W 84/042 (2013.01)

(58) Field of Classification Search
None
See application file for complete search history.

(56) References Cited

U.S. PATENT DOCUMENTS

| | | | |
|---|---|---|---|
| 10,033,473 B1* | 7/2018 | Kyrolainen | H04B 17/15 |
| 10,680,693 B1* | 6/2020 | Cohen | H04B 17/391 |
| 10,684,318 B1* | 6/2020 | Kyrolainen | H04B 7/0617 |
| 2017/0141830 A1* | 5/2017 | Cheng | H04B 7/0682 |
| 2019/0052376 A1* | 2/2019 | Chervyakov | H04B 17/318 |
| 2019/0280791 A1* | 9/2019 | Dhananjay | H04B 7/0456 |
| 2019/0296821 A1* | 9/2019 | Choi | H04B 7/086 |
| 2020/0209296 A1* | 7/2020 | Kong | G01R 29/10 |

OTHER PUBLICATIONS

Janssen, A., et al., "Conducted Beamforming Testing in the Millimeter Wave Spectrum," WSA 2019, 23rd International ITG Workshop on Smart Antennas, pp. 93-98, Apr. 2019.

* cited by examiner

*Primary Examiner* — Ajit Patel
(74) *Attorney, Agent, or Firm* — Christensen O'Connor Johnson Kindness PLLC

(57) ABSTRACT

A test system for testing a device under test comprises a testing device and a device under test. A beam control channel is established between the device under test and the testing device, via which a respective beam of the device under test to be applied is controlled such that beamforming of the device under test is carried out in the testing device. The testing device applies a transposed combined channel matrix, wherein the transposed combined channel matrix encompasses a transposed beamforming matrix of the device under test, a transposed channel matrix and a transposed beamforming matrix of an entity emulated by the testing device. Further, a method of testing a device under test is described.

18 Claims, 2 Drawing Sheets

TEST SYSTEM AS WELL AS A METHOD OF TESTING A DEVICE UNDER TEST

FIELD OF THE DISCLOSURE

Embodiments of the present disclosure relate generally to a test system for testing a device under test. Further, embodiments of the present disclosure relate generally to a method of testing a device under test by means of a test system.

BACKGROUND

Modern communication devices use telecommunication standards that provide additional functionalities that have to be tested. One of these functionalities corresponds to a beamforming function that is used by modern communication devices in order to fulfill the respective requirements of modern telecommunication standards. Therefore, the proper operation of the respective beamforming function has to be tested in advance.

For instance, usage of an analog beamforming function is gaining a lot of momentum in new telecommunication standards like 5G-NR, especially when it comes to Frequency Range 2, also called mmW FR2 due to the millimeter wave range (mmW range), which includes frequency bands from 24.25 GHz to 52.6 GHz. In fact, the beamforming function is the essential mean to compensate high path loss inherent at carrier frequencies higher than 8 GHz.

In former times, the classical approach for a system end-to-end testing corresponds to connecting the device under test to a network and channel emulator via cables. However, this approach is not feasible anymore for mmW systems due to the tight integration of the required antenna elements and the side of the device under test, also called user equipment side (UE side).

In order to overcome that problem mmW system end-to-end testing is usually performed wireless in so-called over-the-air (OTA) chambers. However, this approach is cost-intensive and it suffers from technical problems regarding calibration and replicability. Moreover, far-field testing is complicated due to the restricted space available within the OTA chambers.

In a further recent approach, it was suggested to move the beamforming function associated with the user equipment to the channel emulator for mmW system end-to-end testing purposes or using an external fader module that is interconnected between the device under test and a respective testing device that is used for testing the device under test.

However, even the recent approach has some drawbacks, as testing the device under test lasts long, resulting in high costs for performing the respective tests on the device under test.

SUMMARY

Accordingly, there is a need for a system and a method, enabling cost-efficient and fast testing of a device under test.

The present disclosure provides a test system for testing a device under test. In an embodiment, the test system comprises a testing circuit or device and a device under test. A beam control channel is established between the device under test and the testing device, via which a respective beam of the device under test to be applied is controlled such that beamforming of the device under test is carried out in the testing device. Further, the testing device applies a transposed combined channel matrix. The transposed combined channel matrix encompasses a transposed beamforming matrix of the device under test, a transposed channel matrix and a transposed beamforming matrix of an entity emulated by the testing device.

Further, embodiments of the present disclosure provide a method of testing a device under test by means of a test system. In an embodiment, the method comprises the following steps:

establishing a beam control channel between a device under test and a testing device, submitting at least one beam control signal associated with the device under test from the device under test to the testing device via the beam control channel, wherein the beam control channel defines the beam of the device under test to be applied, and processing the at least one beam control signal received by the testing device, thereby applying a transposed combined channel matrix, the transposed combined channel matrix encompassing a transposed beamforming matrix of the device under test, a transposed channel matrix and a transposed beamforming matrix of an entity emulated by the testing device.

Accordingly, the testing device of the test system receives the respective beam control signal(s) from the device under test via the beam control channel established between the device under test and the testing device. The at least one beam control signal comprises information concerning the beamforming characteristics of the device under test to be applied for the testing purposes. The respective beam control signal is processed by the testing device in order to adapt a test signal used for testing the device under test.

In some embodiments, the testing device applies a transposed combined channel matrix on the test signal for adapting the test signal accordingly. The transposed combined channel matrix generally ensures that the beamforming of the device under test as well as the entity emulated by the testing device, the communication of which with the device under test is emulated by the testing device.

For simulating the respective communication, the beamforming of the entity emulated as well as the (communication) channel established between the device under test and the entity emulated are taken into consideration by the testing device while applying the channel matrix as well as the beamforming matrix of the entity emulated. In addition, the beamforming of the device under test itself is also taken into consideration by applying the beamforming matrix of the device under test.

The respective matrices mentioned above are applied in a transposed manner due to the respective order they are applied.

In total, the transposed combined channel matrix is applied that consists of the transposed beamforming matrix of the device under test, the transposed channel matrix and the transposed beamforming matrix of the entity emulated by the testing device.

In some embodiments, the combined channel matrix includes transmitter and receiver side beamforming.

Generally, the beamforming matrices correspond to respective beamforming weights that are associated with respective antenna elements of the entity emulated and the device under test. By weighting a certain antenna element or a group of antenna elements differently, the radiation beam for transmitting and/or receiving radio signals can be adapted appropriately, generally described as beamforming.

These beamforming weights associated with the device under test are forwarded from the device under test to the testing device via the beam control channel that is established between the device under test and the testing device, for example by the beam control signal forwarded to the testing device. In other words, the at least one beam control signal encompasses the respective information with regard to the respective beam of the device under test to be applied for the test to be performed. Accordingly, the beamforming of the device under test is carried out in the separately formed testing device, as the testing device implements the information received via the beam control channel when generating a test signal to be forwarded to the device under test.

As mentioned above, the transposed combined channel matrix encompasses a transposed beamforming matrix of the device under test, a transposed channel matrix and a transposed beamforming matrix of the testing device. This can be formulated mathematically by the following equation:

$$y = B_{EE}^T H^T B_{DUT}^T * x = (B_{DUT} H B_{EE})^T * x = H_c^T * x,$$

wherein y corresponds to the output test signal that is outputted by the testing device, wherein x corresponds to the test signal initially generated by the testing device, wherein $B_{DUT}^T$ corresponds to the transposed beamforming matrix of the device under test (DUT), wherein $H^T$ corresponds to the transposed channel matrix, and wherein $B_{EE}^T$ corresponds to the transposed beamforming matrix of the entity emulated (EE) by the testing device. Further, these matrices can be combined to the transposed combined channel matrix $H_c^T$. Accordingly, the test signal initially generated is adapted by applying the transposed combined channel matrix $H_c^T$ in order to obtain the output test signal that is outputted.

In the prior art, the respective information was never used in this way, namely by applying transposed matrices on the test signal initially generated.

According to an aspect, the transposed combined channel matrix is established such that the transposed beamforming matrix of the device under test is applied prior to the transposed beamforming matrix of the entity emulated. This further clearly distinguishes the concept according to the present disclosure from the prior art, as the transposed beamforming matrix of the device under test is applied firstly on the test signal initially generated. In addition, the transposed channel matrix is applied on the signal after the transposed beamforming matrix of the device under test has been applied, but prior to the transposed beamforming matrix of the entity emulated. In contrast thereto, prior art approaches have to apply the beamforming matrix of the entity emulated at the beginning followed by the channel matrix as well as the beamforming matrix of the device under test. However, the former approaches known in the prior art result in slow processing of the beam control signal(s).

Another aspect provides that the testing device corresponds to a network and channel circuit or emulator. Accordingly, the testing device emulates a network for testing the characteristics of the device under test accordingly. In addition, the testing device emulates a respective (communication) channel via which the device under test communicates with the entity emulated, for instance another communication device or a base station.

Another aspect provides that the testing device is configured to simulate a communication entity for the device under test and parts of the device under test simultaneously. In some embodiments, the testing device simulates the behavior of the communication entity that communicates with the device under test, for instance a base station or another communication device, while simulating the beamforming characteristics of the entity emulated.

Further, the testing device also simulates the device under test partly, as the respective beamforming functionality of the device under test is simulated by means of the testing device. In some embodiments, the beamforming functionality is simulated, as the beam of the device under test to be applied is controlled via the beam control channel as well as the information transmitted via this channel to the testing device that applies the respective information, namely the beamforming matrix of the device under test.

Further, the testing device may comprise a signaling circuit or unit and a fading circuit or unit. Thus, the testing device has at least two different units for different purposes. The signaling unit is used to generate a respective test signal to be forwarded to the device under test for testing purposes. This initially generated test signal is adapted by the testing device in order to simulate the beamforming functionality of the device under test and the beamforming functionality of the entity emulated as well as the characteristics of the channel emulated between the device under test and the entity emulated.

In the prior art, the signaling unit was solely associated with the entity emulated to communicate with the device under test, namely the beamforming functionality of the entity emulated as well as the signal used for testing purposes. Further, the fading unit was solely associated with the behavior of the device under test and the emulated channel between the device under test and the entity emulated.

However, this former concept is overcome by aspects of the present disclosure, as the signaling unit is associated with the behavior of the device under test according to the present disclosure while applying the beamforming matrix of the device under test, whereas the fading unit is inter alia associated with the behavior of the entity emulated while applying the beamforming matrix of the entity emulated. This will be described later in more detail.

In some embodiments, the signaling unit comprises a baseband circuit or module, a first beamforming circuit or module and an input for the beam control channel. The fading unit comprises a channel emulating circuit or channel emulator and a second beamforming circuit or module. Accordingly, the signaling unit having the baseband module is (still) used to initially generate a test signal for testing the device under test. The fading unit is (still) used to emulate the channel between the device under test and the entity emulated. However, the signaling unit according to the present disclosure is now used to emulate the beamforming functionality of the device under test, as the signaling unit has the input for the beam control channel such that the respective information received via this input is processed by the signaling unit, for example the first beamforming module in order to adapt the test signal initially generated by the baseband module. Moreover, the fading unit having the second beamforming module is (now) used to emulate the beamforming functionality of the entity emulated.

This way, the beamforming weights associated with the device under test can be applied within the signaling unit of the testing device.

In some embodiments, the baseband module is configured to generate a test signal. The first beamforming module is configured to adapt the test signal by applying the transposed beamforming matrix of the device under test, thereby generating a pre-adapted test signal. The channel emulator is configured to adapt the pre-adapted test signal by applying the transposed channel matrix, thereby generating an adapted test signal. The second beamforming module is configured to adapt the adapted test signal by applying the transposed beamforming matrix of the entity emulated, thereby generating an output test signal. Accordingly, the test signal is initially generated by the baseband module, wherein the test signal is adapted subsequently by the first beamforming module with regard to the beamforming characteristics of the device under test while applying the transposed beamforming matrix of the device under test. The respective information was obtained via the beam control channel.

The steps mentioned above were done by the signaling unit, namely the baseband module and the first beamforming module. The signaling unit forwards the respective pre-adapted test signal to the fading unit for further processing. Accordingly, the pre-adapted test signal obtained by the fading unit is processed by the channel emulator of the fading unit firstly. The channel emulator emulates the respective channel to be tested between the device under test and the entity emulated. For this purpose, the channel emulator applies the transposed channel matrix on the pre-adapted test signal received from the signaling unit, for example the first beamforming module associated with an output of the signaling unit. Afterwards, the signal outputted by the channel emulator, namely the adapted test signal, is received by the second beamforming module that applies the transposed beamforming matrix of the entity emulated such that the beamforming functionality of the entity emulated is considered appropriately. Thereby, the output test signal is generated, which is forwarded to the device under test for testing purposes.

In some embodiments, the signaling unit and the fading unit are interconnected with each other in a signal-transmitting manner. In some embodiments the channel emulator located upstream within the fading unit is connected with the first beamforming module of the signaling unit, which is located downstream within the signaling unit.

According to a further aspect, the testing device has a housing that encompasses the signaling unit and the fading unit. The signaling unit and the fading unit are established by separate hardware circuits. Thus, both units are encompassed in a single device, namely the testing device. This means that the fading unit is not established in a separate manner with regard to the signaling unit. Since the signaling and fading units are established by separate hardware circuits, it is ensured that they are physically separated within the testing device. For instance, in some embodiments, the signaling and fading units are established by different field programmable gate arrays (FPGAs) and/or different application-specific integrated circuits (ASICs). Hence, no interface between the signaling unit and the fading unit is required, which would result in additional efforts as well as undesirable additional latency.

The beam control channel may be provided by an uplink interface. The uplink interface may be established between respective signaling units of the testing device and the device under test. Hence, an already existing interface between the device under test and the testing device can be used for forwarding the respective information with regard to the beamforming functionality, namely the beamforming weights associated with the device under test.

For instance, the uplink interface is an air interface. Thus, no cables are required for establishing the respective uplink interface between the device under test and the testing device.

In some embodiments, the uplink interface may be a 5G-NR uplink interface and/or an LTE E-UTRA uplink interface. 5G-NR as well as LTE E-UTRA corresponds to modern telecommunication standards that require beam-forming functionality of the communication devices in order to fulfill the respective requirements, which in turn has to be tested.

According to another aspect, the testing device is configured to simulate multiple beams simultaneously. Therefore, handover scenarios and other scenarios can be tested easily by the test system.

For instance, the testing device has an output and at least two baseband circuits or modules associated with the output. The at least two baseband modules may be used to simulate at least two beams simultaneously. The baseband modules may be assigned to respective signal paths that merge into each other by means of an adder that is configured to add the signals associated with the multiple beams simulated.

Generally, the number of baseband modules and/or the number of beams can be increased as desired.

Furthermore, the output test signal may be forwarded to the device under test. Thus, the device under test receives the respective output test signal that was generated appropriately in order to simulate the beamforming functionalities of the device under test itself and the entity emulated as well as the (communication) channel characteristics.

Furthermore, the output test signal is forwarded via a downlink interface established between the device under test and the testing device. The downlink interface may relate to an air interface, for instance a 5G-NR downlink interface and/or an LTE E-UTRA downlink interface.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
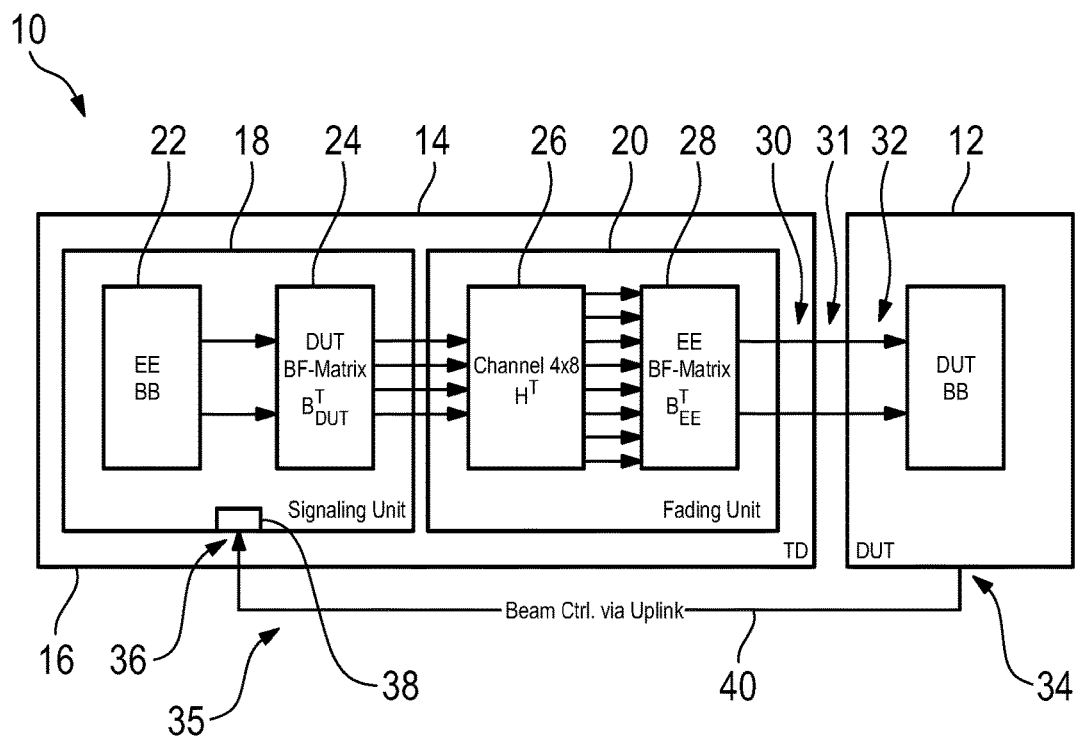
FIG. 1 schematically shows a representative embodiment of a test system according to the present disclosure.

FIG. 1 shows a test system 10 for testing a device under test 12, abbreviated by DUT. The test system 10 comprises the device under test 12 itself as well as a testing device 14, abbreviated by TD, which is established as a single-housed device with a housing 16.

In the embodiment shown, the testing device 14 has a signaling circuit or unit 18 as well as a separately formed fading circuit or unit 20, wherein the signaling unit 18 and the fading unit 20 are connected with each other in a signal-transmitting manner. The signaling unit 18 and the fading unit 20 may be established by separately formed hardware circuits, for instance by different field programmable gate arrays (FPGAs) and/or different application-specific integrated circuits (ASICs).

The signaling unit 18 has a baseband circuit or module 22 as well as a first beamforming module 24, whereas the fading unit 20 has a channel emulating circuit or channel emulator 26 and a second beamforming module 28.

In FIG. 1, the baseband module 22 is abbreviated by "EE BB", namely "entity emulated baseband", the first beamforming module 24 is abbreviated by "DUT BF-Matrix" for "device under test Beamforming Matrix", and the second beamforming module 28 is abbreviated by "EE BF-Matrix" for "entity emulated Beamforming Matrix", which will be described later in more detail.

In addition, the testing device 14 has a downlink interface 30 that is used to establish a downlink communication 31 with the device under test 12, which has a corresponding downlink interface 32. Further, the device under test 12 has an uplink interface 34 that establishes an uplink communication 35 with the testing device 14 having a corresponding uplink interface 36.

In some embodiments, the respective downlink interfaces 30, 32 and the respective uplink interfaces 34, 36 may correspond to air interfaces, for instance a 5G-NR interface and/or an LTE E-UTRA interface. Hence, the downlink communication 31 and the uplink communication 35 are established over-the-air (OTA) without any cable connection.

Moreover, the testing device 14, for example the signaling unit 18, has an input 38 that corresponds to the respective uplink interface 36 of the testing device 14. The signaling unit 18 may receive commands and/or signals via the input 38 from the device under test 12.

In some embodiments, the testing device 14 and the device under test 12 have established a beam control channel 40 among each other, via which a respective beam of the device under test 12 to be applied can be controlled.

The beam control channel 40 is provided by the respective uplink interfaces 34, 36, namely the uplink communication 35 established.

Via the beam control channel 40, a beam control signal can be forwarded from the device under test 12 to the testing device 14. This means that information with regard to a beamforming function of the device under test 12 is submitted via the beam control channel 40 by at least one beam control signal.

The respective information is processed by testing device 14, namely the signaling unit 18. Hence, the beamforming function of the device under test 12 is carried out in the testing device 14 while applying the respective information received via the beam control channel 14 on a signal generated within the signaling unit 18 of the testing device 12, as will be described later.

Figure 2:
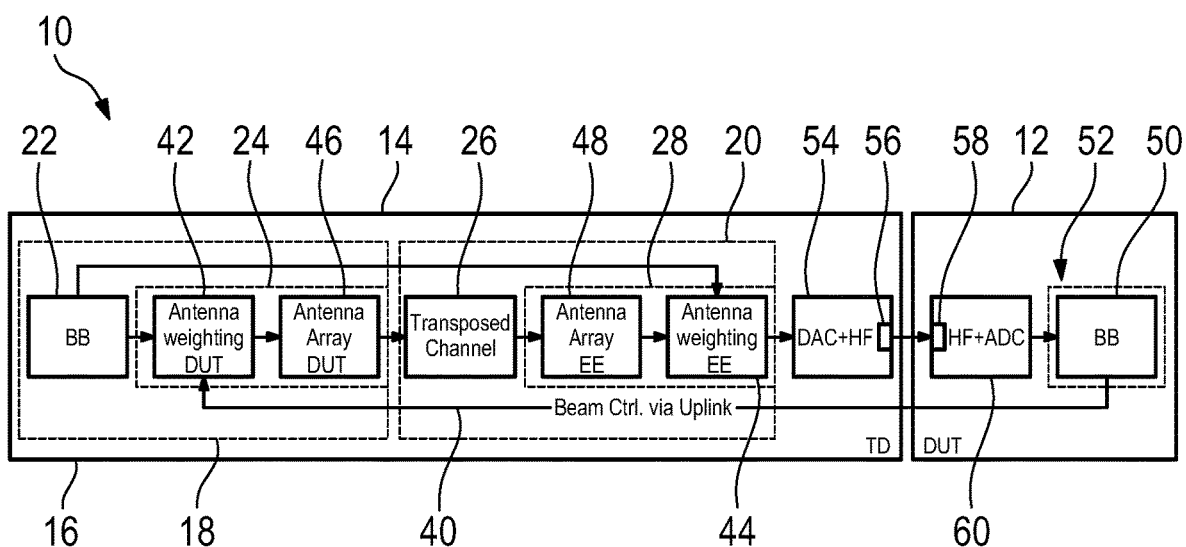
FIG. 2 shows a more detailed overview of the test system of FIG. 1.

In FIG. 2, the test system 10 of FIG. 1 is shown in more detail, as it is further illustrated, that the respective beamforming modules 24, 28 each comprise an antenna weighting component 42, 44 as well as a respective antenna array component 46, 48.

In some embodiments, the first beamforming module 24 comprises the first antenna weighting component 42, abbreviated by "antenna weighting DUT", as well as the first antenna array component 46, abbreviated by "antenna array DUT", whereas the second beamforming module 28 comprises the second antenna array component 48, abbreviated by "antenna weighting EE", as well as the second antenna weighting component 44, abbreviated by "antenna array EE". The corresponding abbreviated names of the components 42-48 will become clear later when describing the operation of the test system 10 while referring to FIG. 3.

The baseband module 22 of the signaling unit 18 is connected with the first beamforming module 24, namely the first antenna weighting component 42, as well as the second beamforming module 28, namely the second antenna weighting component 44. Hence, information may be forwarded from the baseband module 22 to the second antenna weighting component 44.

Further, the device under test 12 also has a baseband circuit or module 50, abbreviated by "BB" in FIG. 2, which is assigned to a respective signaling circuit or unit 52.

The signaling unit 52 of the device under test 12 is assigned to the uplink interface 34 such that the signaling unit 52 communicates via the beam control channel 40 with the first beamforming module 24 of the testing device 14, namely the first antenna weighting component 42 of the first beamforming module 24.

In addition, FIG. 2 reveals that the testing device 14 has a digital to analog converter 54 as well as a high-frequency output 56, whereas the device under test 12 has a high-frequency input 58 and an analog-to-digital converter 60.

Figure 3:
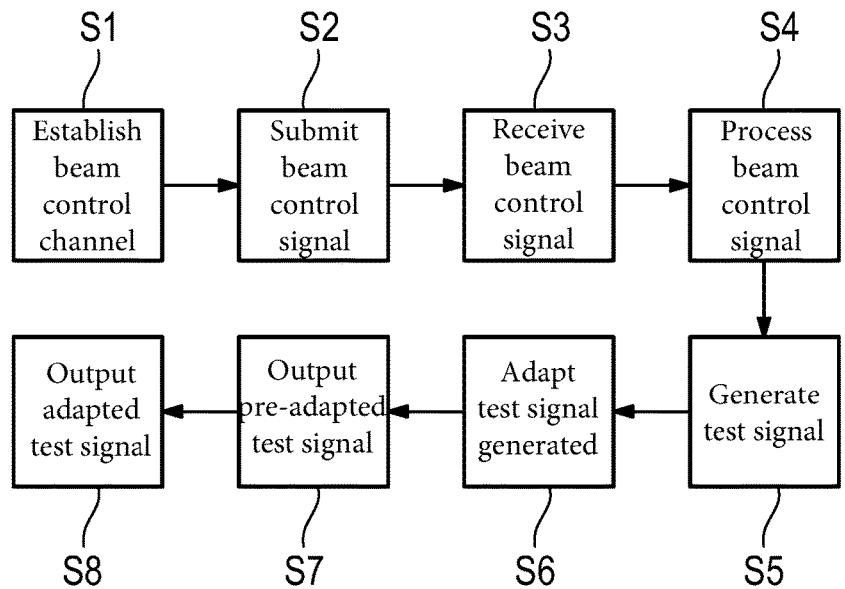
FIG. 3 shows a flow-chart of a representative method of testing a device under test according to the present disclosure.

The test system 10 shown in FIGS. 1 and 2 is generally configured to perform a method of testing the device under test 12 that will be described hereinafter with reference to FIG. 3. In some embodiments, the test system 10, or components thereof, is configured to carry out one or more steps of method claims 14-17.

In a first step S1, the beam control channel 40 is established between the device under test 12 and the testing device 14, for example between the respective uplink interfaces 34, 36, namely as part of the uplink communication 35.

In a second step S2, at least one beam control signal associated with the device under test 12 is submitted from the device under test 12, for example the signaling unit 52, to the testing device 14 via the beam control channel 40. The beam control signal defines the beam of the device under test 12 to be applied for testing purposes. In some embodiments, the beam control signal comprises the respective information of the beam to be applied.

In a third step S3, the testing device 14 receives the beam control signal via the input 38 associated with the respective uplink interface 36.

In a fourth step S4, the beam control signal is processed by the testing device 14, for example the first beamforming module 24, namely the first antenna weighting component 42 of the first beamforming module 24.

In a fifth step S5, a test signal is generated by means of the signaling unit 18, namely the baseband module 22 of the signaling unit 18.

The baseband module 22 is connected with the first beamforming module 24, for example the first antenna weighting component 42, such that the test signal initially generated by the baseband module 22 is forwarded to the first beamforming module 24, namely the first antenna weighting component 42.

In a sixth step S6, the first beamforming module 24, namely the first antenna weighting component 42, adapts the initially generated test signal received from the baseband module 22 by applying a transposed beamforming matrix of the device under test 12, thereby generating a pre-adapted test signal.

The respective information associated with the transposed beamforming matrix applied on the initially generated signal was obtained via the beam control channel 40 previously.

Hence, the first beamforming module 24 applies the respective antenna weightings associated with the device under test 12 on the initially generated test signal in order to generate a pre-adapted test signal that is forwarded to the first antenna array component 46 of the first beamforming module 24, namely a component emulating the respective antenna array of the device under test 12.

Generally, the first antenna weighting component 42 as well as the first antenna array component 46 both are associated with the device under test 12, namely a user equipment ("UE"), as illustrated in FIG. 2. Therefore, the first beamforming module 24 is labelled by "DUT BF-Matrix", the first antenna weighting component 42 is labelled by "antenna weighting DUT", and the first antenna array component 46 is labelled by "antenna array DUT", as they relate to the device under test 12, for example its beamforming functionality.

In other words, the components 42, 46 assigned with the first beamforming module 24 are used to apply the respective information associated with the beamforming weightings directly on the test signal initially generated by the baseband module 22.

Accordingly, the first beamforming module 24 applies the transposed beamforming matrix of the device under test $B_{DUT}^T$ on the test signal initially generated.

In a seventh step S7, the first beamforming module 24 outputs the pre-adapted test signal to the channel emulator 26 of the fading unit 20, which is configured to adapt the pre-adapted test signal by applying the transposed channel matrix $H^T$, thereby generating an adapted test signal.

In an eighths step S8, the channel emulator 26 outputs the adapted test signal to the second beamforming module 28 that further adapts the adapted test signal by applying the transposed beamforming matrix of the entity emulated by the testing device 14, namely $B_{EE}^T$.

As shown in FIG. 2, the second beamforming module 28 comprises the second antenna array component 48 as well as the second antenna weighting component 44, both associated with the entity emulated by the testing device 14, abbreviated by EE for "entity emulated", for instance a base station or another communication device.

The second antenna weighting component 44 of the second beamforming module 28 is connected with the baseband module 22 of the signaling unit 18 such that the respective beamforming weightings, used for establishing the transposed beamforming matrix of the entity emulated $B_{EE}^T$, is received by the second beamforming module 28, for example the second antenna weighting component 44. As mentioned above, the transposed beamforming matrix of the entity emulated $B_{EE}^T$ is applied on the adapted test signal received from the channel emulator 26.

In a ninth step S9, the second beamforming module 28 outputs the output test signal y that is processed by the digital-to-analog converter 52 as well as the high-frequency output 54.

The output test signal y is forwarded via the respective downlink interfaces 30, 32, namely the downlink communication 31, to the device under test 12, which receives the respective output test signal via its high-frequency input 56 and the analog-to-digital converter 58.

In general, the entire testing device 12 is configured to apply a transposed combined channel matrix $H_c^T$ that encompasses the transposed beamforming matrix of the device under test 12, namely $B_{DUT}^T$, the transposed channel matrix, namely $H^T$, as well as the transposed beamforming matrix of the entity emulated, namely $B_{EE}^T$.

The transposed combined channel matrix $H_c^T$ can be described as follows:

$$H_c^T = (B_{DUT} H B_{EE})^T = B_{EE}^T H^T B_{DUT}^T$$

The baseband module 22 of the testing device 14 initially generates a test signal x, which is adapted by the testing device 14 by applying the transposed combined channel matrix $H_c^T$ on this initially generated test signal. This can be described mathematically as follows:

$$y = B_{EE}^T H^T B_{DUT}^T * x = (B_{DUT} H B_{EE})^T * x = H_c^T * x,$$

wherein y corresponds to the output test signal that is outputted via the high-frequency output 54 towards the device under test 12.

In some embodiments, the beamforming functionality, namely the beamforming weightings, of the device under test 12 is carried out in the testing device 14.

Therefore, the beamforming weightings are applied directly on the test signal initially generated, namely prior to the beamforming weightings of the entity emulated by the testing device 14, which are applied after applying the transposed channel matrix by the channel emulator 26 of the fading unit 20.

Figure 4:
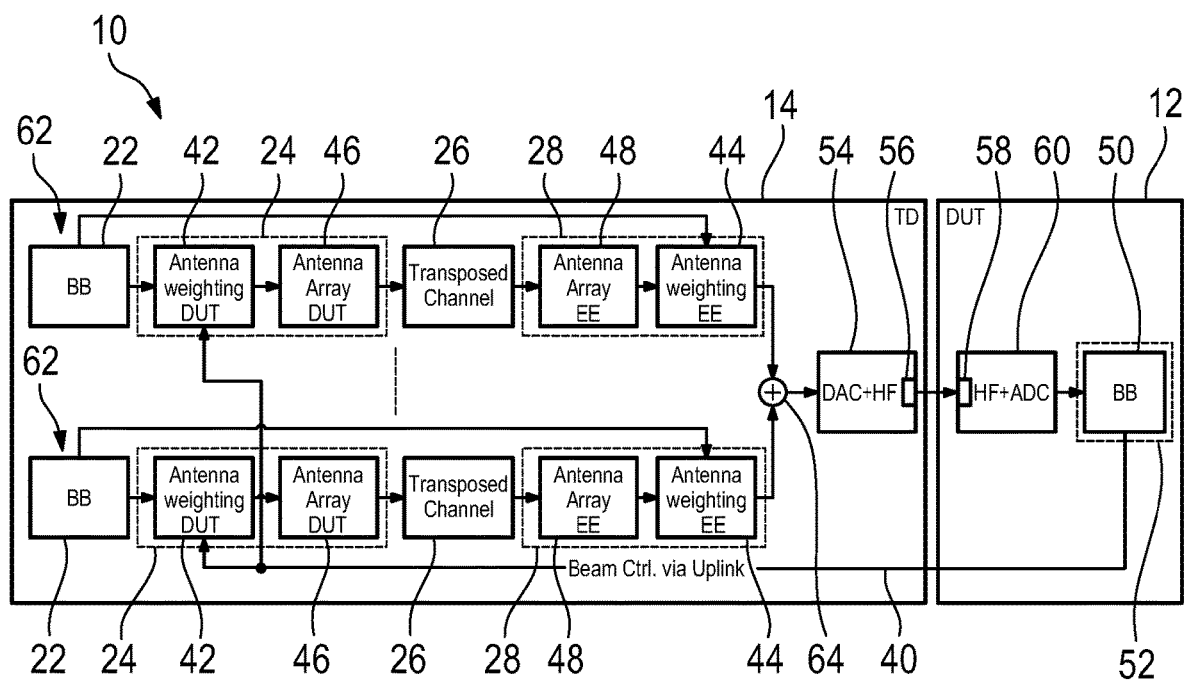
FIG. 4 schematically shows another representative embodiment of a test system according to the present disclosure.

In FIG. 4, another embodiment according to the present disclosure is shown that is enabled to simulate multiple beams simultaneously.

In the shown embodiment, the testing device 14 comprises two baseband modules 22 assigned to a respective signal path 62.

Each signal path 62 comprises a respective first beamforming module 24 that is connected with the corresponding channel emulator 26 that is connected with the corresponding second beamforming module 28.

The respective output test signals of each signal path 62 are forwarded to an adder 64 located downstream of the digital-to-analog converter 52 and the high-frequency output 54.

Accordingly, the signal paths 62 each provide an output test signal associated with a certain beam, which are added by the adder 64 prior to forwarding the summed output test signal to the digital-to-analog converter 52 and the high-frequency output 54 for outputting that signal to the device under test 12 for testing purposes.

The present disclosure generally provides that the beamforming weightings, also called beamforming weights associated with the device under test 12, are carried out in the testing device 14 emulating an entity for the device under test 12. In some embodiments, the beamforming weightings associated with the device under test 12 are processed by the signaling unit 18 of the testing device 14, namely the first beamforming module 24, for example the first antenna weighting component 42.

Therefore, the beamforming weightings associated with the device under test 12 are applied on the initially generated test signal, for example the one generated by the baseband module 22 that emulates the entity accordingly, by means of the transposed beamforming matrix of the device under test 12, namely $B_{DUT}^T$.

Afterwards, the signal obtained is forwarded to the fading unit 20 for further adapting the signal appropriately, namely applying the transposed channel matrix $H^T$ as well as applying the transposed beamforming matrix of the entity emulated by the testing device 14, namely $B_{EE}^T$.

In total, the testing device 14 applies the transposed combined channel matrix $H_c^T$ on the initially generated test signal.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A test system for testing a device under test, said test system comprising a testing device and a device under test,
    a beam control channel being established between said device under test and said testing device, via which a respective beam of said device under test to be applied is controlled by at least one beam control signal such that beamforming of said device under test is carried out in said testing device,
    said testing device processing said at least one beam control signal,
    said testing device applying a transposed combined channel matrix on a test signal for testing said device under test,
    said transposed combined channel matrix encompassing in sequence a transposed beamforming matrix of said device under test, a transposed channel matrix and a transposed beamforming matrix of an entity emulated by said testing device.

2. The test system according to claim 1, wherein said transposed combined channel matrix is established such that said transposed beamforming matrix of said device under test is applied prior to said transposed beamforming matrix of said entity emulated.

3. The test system according to claim 1, wherein said testing device corresponds to a network and channel emulator.

4. The test system according to claim 1, wherein said testing device is configured to simulate a communication entity for said device under test and parts of said device under test simultaneously.

5. The test system according to claim 1, wherein said testing device comprises a signaling circuit and a fading circuit.

6. The test system according to claim 5, wherein said signaling circuit comprises a baseband module, a first beamforming module and an input for said beam control channel, and wherein said fading circuit comprises a channel emulator and a second beamforming module.

7. The test system according to claim 6, wherein said baseband module is configured to generate said test signal,
    said first beamforming module being configured to adapt said test signal by applying said transposed beamforming matrix of said device under test, thereby generating a pre-adapted test signal,
    said channel emulator being configured to adapt said pre-adapted test signal by applying said transposed channel matrix, thereby generating an adapted test signal,
    said second beamforming module being configured to adapt said adapted test signal by applying said transposed beamforming matrix of said entity emulated, thereby generating an output test signal.

8. The test system according to claim 5, wherein said testing device has a housing that encompasses said signaling circuit and said fading circuit, said signaling unit and said fading unit being established by separate hardware circuits.

9. The test system according to claim 1, wherein said beam control channel is provided by an uplink interface.

10. The test system according to claim 9, wherein said uplink interface is an air interface.

11. The test system according to claim 9, wherein said uplink interface is at least one of a 5G-NR uplink interface and an LTE E-UTRA uplink interface.

12. The test system according to claim 1, wherein said testing device is configured to simulate multiple beams simultaneously.

13. The test system according to claim 1, wherein said testing device has an output and at least two baseband modules associated with said output.

14. A method of testing a device under test by a test system, comprising:
- establishing a beam control channel between a device under test and a testing device;
- submitting at least one beam control signal associated with said device under test from said device under test to said testing device via said beam control channel, said beam control signal defining the beam of said device under test to be applied; and
- processing said at least one beam control signal received by means of said testing device, thereby applying a transposed combined channel matrix on a test signal for testing said device under test, said transposed combined channel matrix encompassing in sequence a transposed beamforming matrix of said device under test, a transposed channel matrix and a transposed beamforming matrix of an entity emulated by said testing device.

15. The method according to claim 14, wherein:
- said test signal is adapted by applying said transposed beamforming matrix of said device under test, thereby generating a pre-adapted test signal,
- said pre-adapted test signal is adapted by applying said transposed channel matrix, thereby generating an adapted test signal, and
- said adapted test signal is adapted by applying said transposed beamforming matrix of said entity emulated, thereby generating an output test signal.

16. The method according to claim 15, wherein said output test signal is forwarded to said device under test.

17. The method according to claim 15, wherein said output test signal is forwarded via a downlink interface established between said device under test and said testing device.

18. A test system for testing a device under test, said test system comprising a testing device and a device under test,
- a beam control channel being established between said device under test and said testing device, via which a respective beam of said device under test to be applied is controlled by at least one beam control signal such that beamforming of said device under test is carried out in said testing device,
- said testing device configured to process said at least one beam control signal,
- said testing device configured to apply a transposed combined channel matrix on a test signal for testing said device under test, said transposed combined channel matrix encompassing a transposed beamforming matrix of said device under test, a transposed channel matrix and a transposed beamforming matrix of an entity emulated by said testing device, wherein said transposed combined channel matrix is established such that said transposed beamforming matrix of said device under test is applied prior to said transposed beamforming matrix of the emulated entity.

* * * * *